(12) United States Patent  
Ganesan et al.

(10) Patent No.: US 8,473,530 B1  
(45) Date of Patent: Jun. 25, 2013

(54) FIELD OBJECTS

(75) Inventors: Elango Ganesan, Novato, CA (US); Anne Strand, San Rafael, CA (US); John Nolan, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 1560 days.

(21) Appl. No.: 11/083,620

(22) Filed: Mar. 17, 2005

(51) Int. Cl.  
*G06F 17/30* (2006.01)

(52) U.S. Cl.  
USPC ............................ 707/821; 707/602; 707/829

(58) Field of Classification Search  
None  
See application file for complete search history.

(56) References Cited

U.S. PATENT DOCUMENTS 5,987,472 A * 11/1999 Serafin .................. 707/104.1

OTHER PUBLICATIONS

Outside Autocad, The Nonprogammer's guide to Managing Autocad's Database for release 12 by Dale Evans.*

The Information System Consultant's Handbook, System Analysis and Design by William S. Davis and David C. Yen.*  
Core Java, Second Edition by Gary Cornell and Cay S. Horstmann.*  
"Autodesk DXF Reference Guide" Jan. 5, 2002.*  
"C++ string class" (as taken from http://web.archive.org/web/20011231021317/http://www.bgsu.edu/departments/compsci/docs/string.html).*

* cited by examiner

*Primary Examiner* — Hosain Alam  
*Assistant Examiner* — Bruce Witzenburg  
(74) *Attorney, Agent, or Firm* — Fish & Richardson P.C.

(57) ABSTRACT

A data structure defining a field in an electronic file is described, the field including updateable text. The data structure can be included, for example, in a computer-aided design drawing. In one implementation, the data structure includes: an evaluator identifier; a field code; a child field quantity; if the child field quantity is greater than zero, then one or more child field identifiers; an object reference quantity; if the object reference quantity is greater than zero, then one or more object reference identifiers; a field format; a field filing option; a field state; an evaluation status; an evaluation error; an evaluation error message; an evaluated field value; a formatted field value; a formatted field value length; an extended data quantity; and, if the extended data quantity is greater then zero, than one or more extended data.

5 Claims, 4 Drawing Sheets

FIELD OBJECTS

BACKGROUND

The following disclosure relates to computing systems and information storage.

Computer-aided design (CAD) software applications have been available for many years to assist in preparing two dimensional and three dimensional drawings and models. AutoCAD® software available from Autodesk, Inc. of San Rafael, Calif. is an example of a widely used CAD software application. A CAD software application may provide for sets of drawings to be created, which may or may not include common information. For example, the plans for a project may require multiple drawings on several "sheets", similar to traditional drawings prepared on paper. Information identifying the project, draftsperson, date, etc., may appear in a common location on all sheets within the set of drawings for identification purposes. Other textual information is often included in drawings, including, dimensions, comments, and filenames, to name a few.

SUMMARY

The following describes apparatus and techniques relating to a data structure defining a field. In general, in one aspect, the invention features a data structure defining a field in an electronic file, a field including updateable text. The data structure includes: an evaluator identifier; a field code; a child field quantity; if the child field quantity is greater than zero, then one or more child field identifiers; an object reference quantity; if the object reference quantity is greater than zero, then one or more object reference identifiers; a field format; a field filing option; a field state; an evaluation status; an evaluation error; an evaluation error message; an evaluated field value; a formatted field value; a formatted field value length; an extended data quantity; and, if the extended data quantity is greater then zero, than one or more extended data.

Implementations of the invention can further include one or more of the following features. The data structure can be configured to be included in an electronic file having a predetermined format, for example, a .dwg, a .dwt or a .dxf format. The evaluated field value can be included in a field value container object including a value type and a value. The evaluator identifier can be used to locate a field evaluator application to evaluate the field, and can be a string type. The field code can be a string type including text that includes information to evaluate the field and format an evaluated field value as text to display in a drawing in a computer-aided design application.

A child field can be a second field embedded within the field, and the child field quantity is the number of child fields embedded within the field. The child field quantity can be an integer type and have a size of substantially four bytes. The one or more child field identifiers identify the one or more child fields, if any, embedded within the field and can be an array of object identifiers.

An object reference can be a reference to an object in a computer-aided design drawing. The object reference quantity is the number of object references in the field code, and can be an integer type and have a size of substantially four bytes. The one or more object reference identifiers identify the one or more object references in the field code and can be an array of object identifiers.

The field format can be used to format an evaluated field value as text to generate a formatted field value and to display the formatted field value in a computer-aided design drawing.

In one implementation the field format is a string type and the formatted field value is a string type. The formatted field value length specifies a length of the formatted field value, and can be an integer type and have a size of substantially four bytes.

The field filing option can include one or more options to control how the data structure is filed, and can be an integer type and have a size of substantially four bytes. For example, the field filing option can include an option to file out an evaluated field value. The field state can specify a current state of the data structure, and can be an integer type and have a size of substantially four bytes. The evaluation status can specify a status of a last evaluation, and can be an integer type and have a size of substantially four bytes. The evaluation error can specify an error code if a last evaluation of the field failed, where an error code is set by an evaluator after evaluating the field. The evaluation error can be an integer type and have a size of substantially four bytes. The evaluation error message can specify text describing the evaluation error and is set by the evaluator after evaluating the field. The evaluation error message can be a string type.

Extended data can include additional data that can be stored in the data structure and can be stored as an array of a field value object. The extended data quantity specifies a number of extended data stored in the data structure. A field value object is a container object including a value type and a value.

In general, in another aspect, the invention features a data structure defining a field in an electronic file, a field including updateable text. The data structure includes: an evaluator identifier; a field code; a child field quantity; if the child field quantity is greater than zero, then one or more child field identifiers to identify the one or more child fields; an object reference quantity; and if the object reference quantity is greater than zero, then one or more object reference identifiers to identify one or more object references. The evaluator identifier is configured to locate a field evaluator application to evaluate the field. The field code includes text that includes information to evaluate the field and to format an evaluated field value as text to display in a drawing in a computer-aided design application. A child field is a second field embedded within the field. An object reference is a reference to an object in a computer-aided design drawing.

Implementations of the invention can include one or more of the following features. The data structure can be configured to be included in an electronic file having a predetermined format, for example, a .dwg, .dwt or .dxf format. The data structure can further include a field format, an evaluated field value, a formatted field value and a formatted field value length. The field format can be used to format an evaluated field value as text to generate a formatted field value, and to display the formatted field value in a computer-aided design drawing. The formatted field value can be generated from the evaluated field value. The formatted field value length can specify a length of the formatted field value.

The data structure can further include an evaluation status specifying a status of a last evaluation, an evaluation error and an evaluation error message. The evaluation, error specifies an error code if a last evaluation of the field failed, where an error code is set by an evaluator after evaluating the field. The evaluation error message specifies text describing the evaluation error and is set by the evaluator after evaluating the field.

The data structure can further include extended data, being additional data that can be stored in the data structure as an array of a field value object, and an extended data quantity specifying a number of extended data stored in the data structure. The field value object is a container object including a value type and a value.

In general, in another aspect, the invention features a computer implemented method including the steps of receiving a data structure defining a field and processing the data structure. The data structure includes: an evaluator identifier; a field code; a child field quantity; if the child field quantity is greater than zero, then one or more child field identifiers to identify the one or more child fields; an object reference quantity; and if the object reference quantity is greater than zero, then one or more object reference identifiers to identify one or more object references. The evaluator identifier is configured to locate a field evaluator application to evaluate the field. The field code includes text that includes information to evaluate the field and to format an evaluated field value as text to display in a drawing in a computer-aided design application. A child field is a second field embedded within the field. An object reference is a reference to an object in a computer-aided design drawing.

Implementations of the invention can include one or more of the following. The data structure can be configured to be included in an electronic file having a predetermined format, for example, a .dwg, .dwt or .dxf format. Processing the data structure can include evaluating the data structure and displaying text representing the field defined by the data structure. The field can be displayed in a computer-aided design drawing, and the method can further include the steps of receiving a modification to the computer-aided design drawing; evaluating the data structure based on the modification; and displaying text representing the field defined by the data structure.

Implementations of the invention can realize one or more of the following advantages. Textual information in a drawing or set of drawings can be automatically updated as designs and documentation progress, helping to save time and avoid costly mistakes. Creating, placing and editing a text field is simple. Automatic updates ensure consistency within a drawing and within a set of drawings. Tedious, time-consuming and error-prone manual updating of textual information can be avoided.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Text-based information included in CAD drawings is often updated and revised. Additionally, information can be repeated throughout a drawing or drawing set, for example, a project name, client information, author, date, etc. Updating or entering this information manually can be tedious, time-consuming and prone to human error. A method and data structure is provided to include fields in CAD drawings. A field can be used for textual content that may require updating, for example, information that may change throughout the course of a design project. A data structure defining the field can be included in an electronic file representing a CAD drawing. In one implementation, the data structure can be referred to as a field object, and shall be referred to accordingly herein for illustrative purposes. The electronic file can be in a predetermined format, for example, the .dwg format used by AutoCAD® software. Other formats can be used including .dwt and .dxf.

Figure 1A:
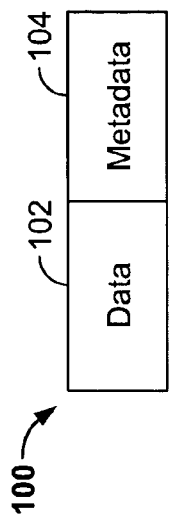
FIG. 1A shows a schematic representation of a .dwg format electronic file.
Figure 1B:
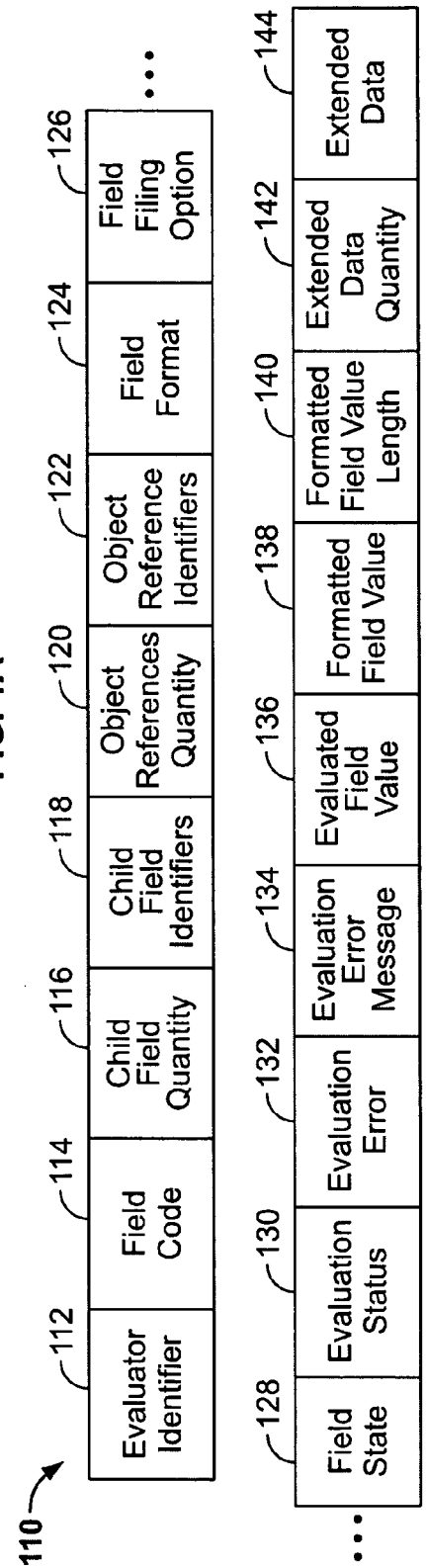
FIG. 1B shows a schematic representation of a field object.

For illustrative purposes, FIG. 1A is a schematic representation of an electronic file 100 in the .dwg format. The electronic file 100 includes data 102 and metadata 104. The data can include graphics objects representative of objects in a given drawing. Metadata 104 can include, for example, control information and/or format information. FIG. 1B is a schematic representation of a field object 110. A field object 110, which is included in the electronic file 100, can include both data 102 and metadata 104.

Figure 2:
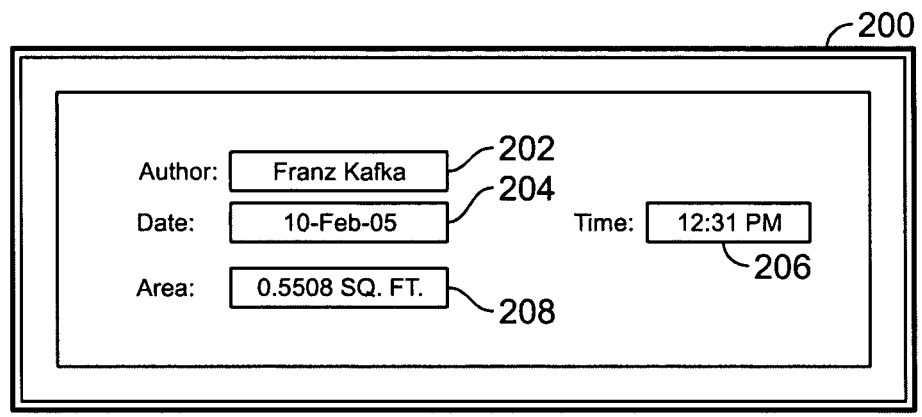
FIG. 2 is a screen shot showing a portion of a CAD drawing including fields.

Referring to FIG. 2, a portion of a CAD drawing 200 is shown that includes multiple fields. For example, an author field 202 is included that includes text specifying the author's name. Date and time fields 204, 206 are included specifying a date and time, for example, a date and time of a last modification to the CAD drawing. An area field 208 is included that specifies the square footage of an object (not shown) in the CAD drawing. If the object is modified, thereby changing the square footage of the object, the text in the area field 208 can be automatically updated to reflect the modification. Similarly, the date and time fields 204, 206 can be automatically updated to reflect the most recent modification to the CAD thawing.

In one implementation, a field engine can be used to create, edit, evaluate and update field objects. An engine, as the term is used throughout this application, can be a piece of hardware that encapsulates a function, can be firmware or can be a software application or portion of a software application. An engine can perform one or more functions, and one piece of hardware, firmware or software can perform the functions of more than one engines. Similarly, more than one piece of hardware, firmware and/or software can be used to perform the function of a single engine described herein. In one implementation, the field engine is a portion of a CAD software application implementing field objects.

Referring again to FIG. 1B, a field object 110, i.e., a data structure defining a field, shall be described in further detail. The field object 110 includes an evaluator identifier 112. The evaluator identifier 112 is used by the field engine to locate a field evaluator application that can evaluate the field. That is, different types of fields can be available, with each type using a corresponding field evaluator application to evaluate the field. For example, AutoCAD® includes a generic field framework that can support creation of different types of fields by vertical and third party applications. Field evaluator applications for the different types of fields can be provided by AutoCAD® and/or the third party. AutoCAD® itself supports five types of fields: variable, object property, sheet set, diesel and expression. Each type of field is represented by a field object and includes an evaluator identifier corresponding to the field evaluator application that can evaluate the type of field. In one implementation, the evaluator identifier 112 is a string type, e.g., the evaluator identifier for a variable type field is "AcVar".

The field object 110 includes a field code 114. The field code 114 is text that includes information necessary to evaluate the field and to format an evaluated field value as text to display in the CAD drawing. In one implementation, the field code 114 is embedded between a field code begin marker %<and a field code end marker >%, and has a generic format as follows:

%<\<EvalId><FieldExpression>\f"<FormatString>" \ href "<HyperlinkUrl>">%

"EvalId" is the evaluator identifier 112 described above. "Field Expression" includes information necessary to evaluate the field. The syntax and content of this component is determined by the field evaluator application corresponding to the field type. "FormatString" is a coded string that describes how the evaluated field value is displayed as text (see description of field format 124 below). For example, if the string value of the field is to be displayed in upper case, then FormatString includes the code % tcl. This component of the field code 114 is optional. "HyperlinkUrl" is the URL (universal resource locator) of a hyperlink if the field supports a hyperlink. If this is set, the field text in the drawing can be used as a hyperlink to navigate to the specified URL. This component of the field code 114 is also optional.

The following are two examples of field codes 114 for two different types of fields, an object property field type and a sheet set field type, respectively.

Object property field type example: %<\AcObjProp Object (%<\_ObjId 2130431696>%).Area \f "% lu6%qf1">%

Sheet set field type example: %<\AcSm Database("D:\ Elango\Autodesk\Sample\SheetSets\Architectural\IRD Addition.dst").SheetSet("g50786B62-0394-4DC2-B91D-3790BAB7A345").Component("g3B68388D-7204-44B3-BA9C-A6CFE8698A74").NumberAndTitle \f "% tcl" \href "D:\Elango\Autodesk\Sample\SheetSets\Architectural\T-01.dwg#,TITLE SHEET##1">%

In the above described implementation, the field code 114 is a string type and has an unlimited size.

A field can included embedded child fields. For example, a text object in AutoCAD® can include a field object that includes the fields embedded in the text as child fields. Referring again to FIG. 2, a text object corresponding to the date and time can include a top level field object that contains text with two child fields, the date field 204 and the time field 206. To capture these types of dependencies, the field object 110 includes a child field quantity 116 that specifies the number of embedded child fields, if any, in a given field object 110. That is, the number can be zero if there are no embedded child fields, or can be two as in the above example. In one implementation, the child field quantity 116 is an integer type and has a size of substantially four bytes.

The field object 110 can further include one or more child field identifiers 118. A child field identifier 118 specifies an identifier of a child field embedded in the given field object 110. In one implementation, a child field identifier 118 is written as an array of AcDbObjectId objects, where an AcDbObjectId is an object that contains a reference to another object stored elsewhere in the CAD drawing. The size can be unlimited. If the child field quantity 116 is not greater than zero, then there are no child field identifiers 118.

The field code 114 described above can include references to objects within the CAD drawing, referred to herein as object references. For example, a field for displaying text specifying the area of a circle included in the CAD drawing can include an object reference corresponding to the circle object. The field object 110 includes the object reference quantity 120, i.e., the number of object references, included in the field code 114. The object reference quantity can be zero, and in one implementation is an integer type having a size of substantially four bytes.

The field object 110 can further include one or more object reference identifiers 122 corresponding to the one or more object references included in the field code 114, if any. An object reference identifier 122 specifies an identifier of an object reference included in the field code 114. In one implementation, an object reference identifier 122 is written as an array of AcDbObjectId objects, where an AcDbObjectId is an object that contains a reference to another object stored elsewhere in the CAD drawing. The size can be unlimited. If the object reference quantity 120 is not greater than zero, then there are no object reference identifiers 122.

A field format 124 is included in the field object 110 to specify a format for an evaluated field value 136. The field format 124 can be used to format the evaluated field value 136 as text, i.e., to generate a formatted field value 138, and to display the formatted field value 138 in the CAD drawing. In one implementation, the field format 124 is a coded string included in the field code 114 and can be, for example, a string type of unlimited size. Examples of field formats 124 are shown in the field code 114 examples above. In the "Object property" field type example of a field code 114, the field format is "%lu6%qf1" and in the "Sheet set" field type example of a field code 114, the field format is "% tcl".

A field filing option 126 can be included in the field object 110, and includes options to control how the field object 110 is filed. For example, an option can be included that specifies whether to file out the evaluated field value 136 or not. In one implementation, the field filing option 126 is an integer type having a size of substantially four bytes.

A field state 128 specifies a current state of the field object 110. For example, the field state 128 can specify whether the field has been initialized, compiled or evaluated. In one implementation, the field state 128 is an integer type having a size of substantially four bytes.

An evaluation status 130 can be included in the field object 110 to specify a status of a last evaluation. For example, the evaluation status 130 can be a success flag or an error category code. Examples of error category codes include "invalid field code" or "invalid context". In one implementation, the evaluation status is an integer type having a size of substantially four bytes.

An evaluation error 132 can be included in the field object 110 to specify an error code if a last evaluation of the field failed. The error code can be set by the field evaluator that evaluated the field. In one implementation, the evaluation error 132 is an integer type having a size of substantially four bytes. The field object 110 can further include an evaluation error message 134 that specifies a text description of the evaluation error 132, e.g., if the last evaluation of the field failed. The evaluation error message 134 can also be set by the field evaluator that evaluated the field. In one implementation, the evaluated error message 134 is a string type of unlimited size.

The field object 110 includes an evaluated field value 136. The evaluated field value 136 includes the value of the field set by a last evaluation of the field. In one implementation, the evaluated field value 136 can be of various types, e.g., string, integer, or floating point number. The evaluated field value 136 can be written as a field value object.

Figure 1C:
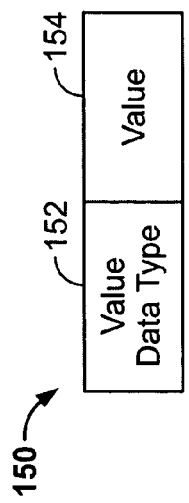
FIG. 1C shows a schematic representation of a field value object.

A schematic representation of a field value object 150 is shown in FIG. 1C. A field value object 150 is a container object to store a value, and includes a value data type 152 specifying the data type of the value, and the value 154. Various types of data can be stored in a field value object 150, including a string, long, double, date, point, 3d point, object identifier, buffer, and resbuf. In one implementation, the value data type 152 is an integer type having a size of substantially four bytes. The value 154 can be various types, as described above. If the value 154 is written as a buffer, then the size of the buffer can be written followed by the contents of the buffer.

The field object 110 can also include a formatted field value 138. The formatted field value 138 includes the value of the field set by a last evaluation (i.e., the evaluated field value 136) that has been formatted as text using the field format 124. In one implementation, the formatted field value 138 is a string type having an unlimited size. The field object 110 can further include a formatted field value length 140 that specifies a length of the last formatted field value 138. For example, in one implementation, if a field evaluation fails, then a number of pound signs (#) equal to the number of characters in the last evaluated field value are displayed, or a default number of four pound signs are displayed if there is no last evaluated field value. The formatted field value length 140 can be used to determine the number of pound signs to display if a field evaluation fails during a next field evaluation.

A field object 110 can optionally include additional arbitrary data referred to as "extended data". For example, the one or more field evaluators can store extended data in the field object 110. The field object 110 can therefore include the extended data 144 and an extended data quantity 142 that specifies the number of such extended data, if any, included in the field object 110. In one implementation, the extended data 144 is stored as an array of field value objects 200.

Figure 3A:
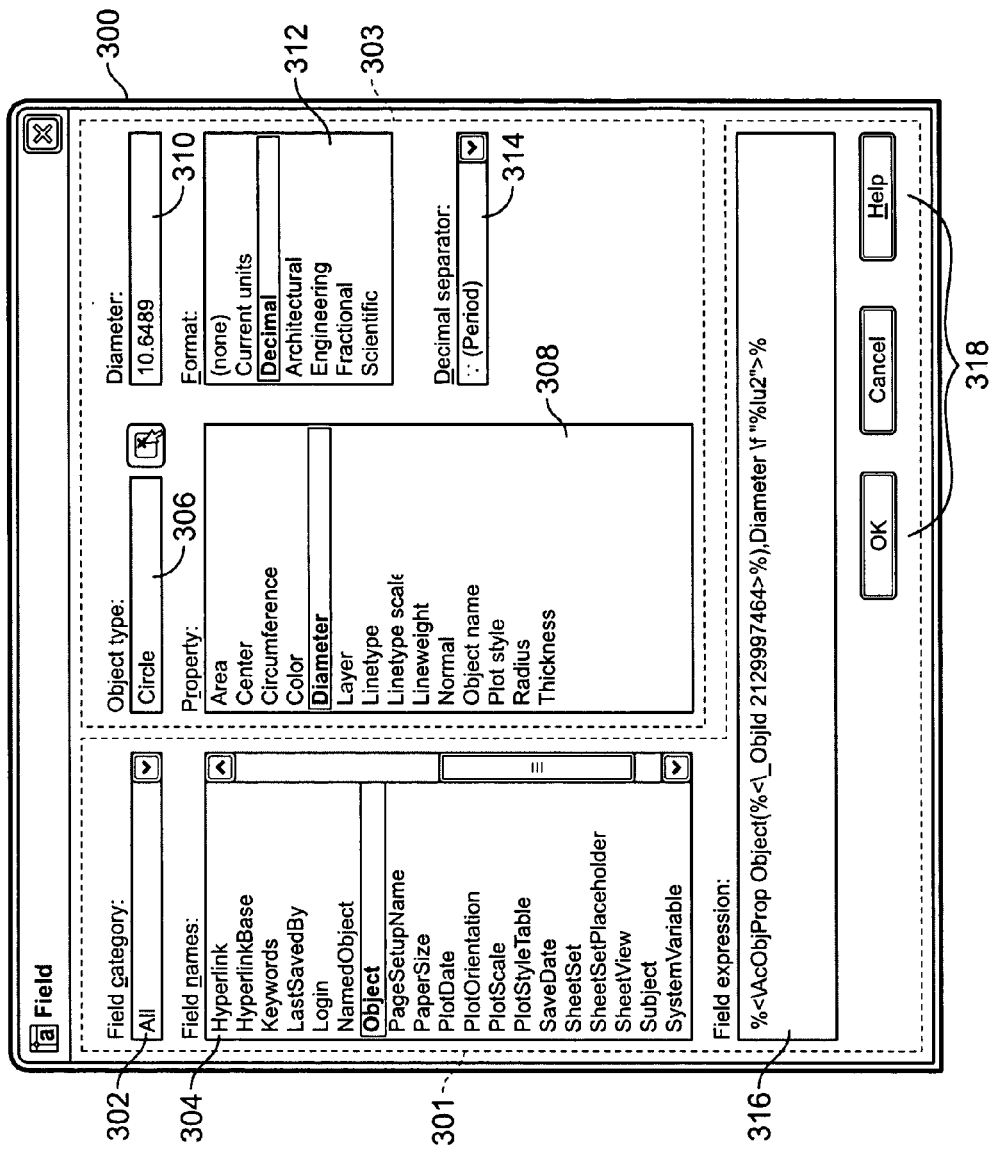
FIGS. 3A and 3B show exemplary user interfaces for creating a field object.
Figure 3B:
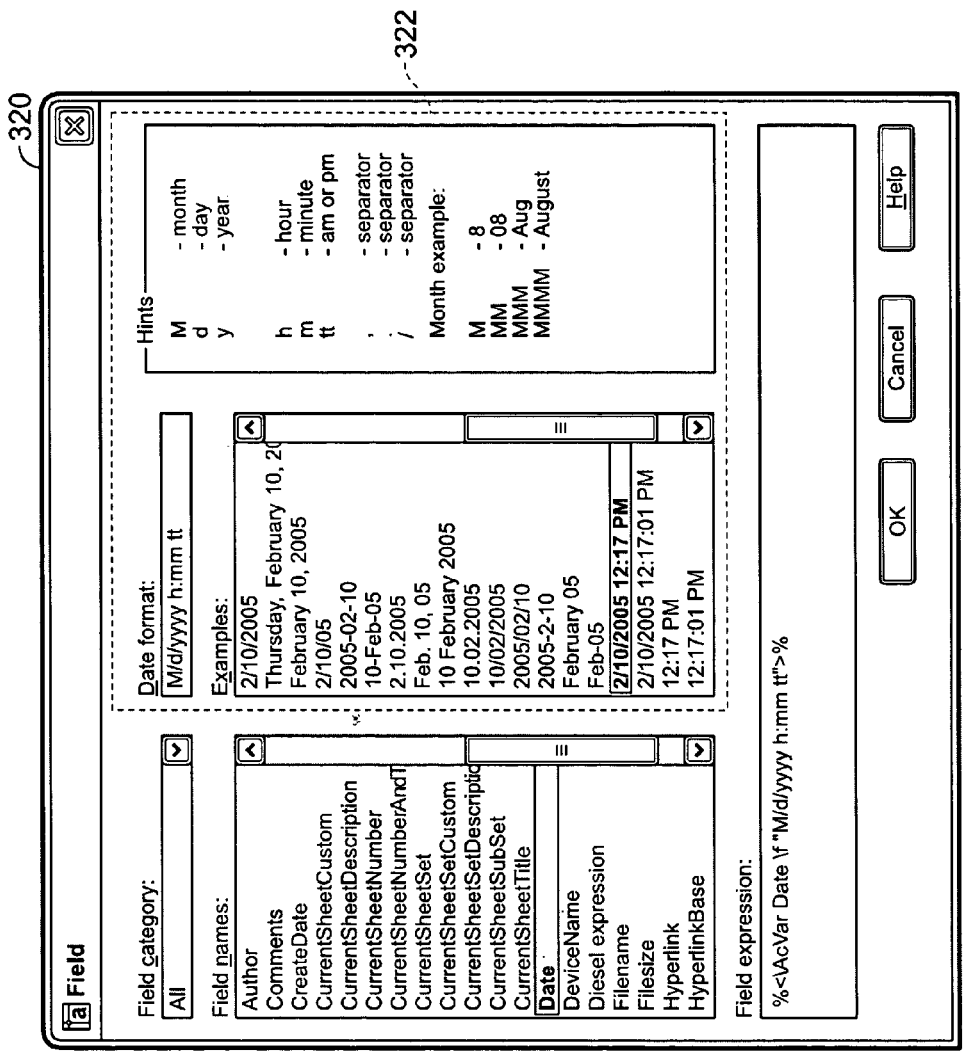

A user of a CAD application implementing field objects can create and edit fields. In one implementation, the user is presented with a field dialog allowing for user input to create or edit a field. Examples of field dialogs provided in AutoCAD® are shown in FIGS. 3A and 3B. Referring to FIG. 3A, the field dialog 300 includes a main component 301 and a sub-component 303. The main component 301 includes the field category box 302, the field names menu 304, the field expression box 316 and OK/Cancel/Help buttons 318. The sub-component 303 is a child dialog that changes based on the field selected in the field names menu 304. For example, referring to FIG. 3B, a field dialog 320 is shown with a different field name selected. The sub-component portion 322 of the field dialog 320 is different than in the field dialog 300 shown in FIG. 3A. Referring again to FIG. 3A, in this example, for an "Object" field, the sub-component of the field dialog 300 includes an Object type box 306, a Property menu 308, a Diameter box 310, a Format menu 312 and a Decimal separator menu 314.

The user can specify whether to view "All" field categories 302 or a subset. In the example shown, "All" has been selected, and an alphabetical list of field names is presented to the user in the field names menu 304 displayed. The user can select (e.g., by highlighting) the field name "Object" (as in this example). An "Object type" 306 is displayed, in this example, a "Circle" object. The circle object is an object that is associated with the field, i.e., the field code 114 for this field includes an object reference identifier 122 to the circle object.

The user can select a property of the object from the property menu 308, in this example the "diameter" property. The diameter of the circle object is displayed in a box 310 (labeled "Diameter"). If, for example, the user had selected the "area" property, then an area of the circle object would have been displayed in the box 310 (which would have been labeled "Area"). A Format menu 312 is presented and, in this example, the user selected the "decimal" format and selected a "period" as the decimal separator from a Decimal separator menu 314. Accordingly, the text displayed in the field representing the diameter of the circle object is in decimal format, e.g., 10.6489. A field expression box 316 displays the field code for the field object that represents the field created by this field dialog 300 (see description of field code 114 above). A user is presented with the options to approve ("OK") or cancel the creation or editing of the field, or to request help using the OK/Cancel/Help buttons 318.

Figure 4:
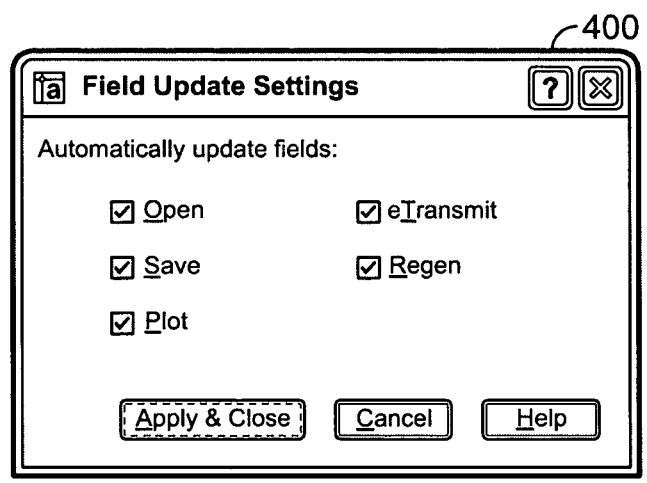
FIG. 4 is an exemplary field update settings dialog box.

Fields can be updated in a CAD drawing when specific commands are initiated by the user. For example, the commands: open, save, plot, eTransmit, Regen (regenerate) and UpdateFields, are commands in AutoCAD® that cause fields to automatically update. In the particular case of AutoCAD®, with the exception of the "UpdateFields" command, the user can set whether or not these commands automatically update the fields upon initiating the commands. Referring to FIG. 4, a field update settings dialog 400 is shown from AutoCAD® that can be invoked from an options dialog to allow a user to select field update settings. By checking boxes corresponding to the commands listed, e.g., open, save, plot, eTransmit and Regen, the user can specify whether or not to automatically update the fields upon execution of some, all or none of these commands.

The field object data structure can be processed by a computer. For example, when including the field object in a .dwg format file, a software application such as AutoCAD® can be used to process the field object. Processing can include, as examples, reading the datastructure, saving the datastructure, extracting from the datastructure, publishing information relating to the datastructure, displaying information (e.g., the field text in a CAD drawing), and the like.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method comprising:
    receiving a data structure defining a field of updateable text where the field is to be displayed in a computer-aided drawing, the data structure comprising:
        an evaluator identifier, the evaluator identifier identifying a type of field where the type can be used to locate a field evaluator application to evaluate the field;
        a field code, the field code including text that includes information to evaluate the field and to format an evaluated field value as text to display in a drawing in a computer-aided design application;
        a child field quantity, a child field being a second field embedded within the field;
        if the child field quantity is greater than zero, then one or more child field identifiers to identify one or more child fields;
        an object reference quantity, an object reference being a reference to an object in a computer-aided design drawing where for a particular field the object is not a child field of the field; and
        if the object reference quantity is greater than zero, then one or more object reference identifiers to identify one or more object references; and
    processing the data structure including displaying the text in the drawing.

2. The method of claim 1, where the data structure is configured to be included in an electronic file having a predetermined format.

3. The method of claim 2, where the predetermined format is a .dwg, .dwt or .dxf file format.

4. The method of claim 1, where processing the data structure further includes evaluating the data structure.

5. The method of claim 1, where the field is to be displayed in a computer-aided design drawing, the method further comprising:
   receiving a modification to the computer-aided design drawing;
   evaluating the data structure based on the modification; and
   displaying text representing the field defined by the data structure.

* * * * *